2,952,906

METHOD OF SOLDERING ALUMINUM TO COPPER OR BRASS

Ogle R. Singleton, Jr., Richmond, Va., assignor to Reynolds Metals Company, Richmond, Va., a corporation of Delaware No Drawing. Filed Aug. 17, 1956, Ser. No. 604,609

7 Claims. (Cl. 29—475)

This invention relates to alloys and more particularly to zinc cadmium base alloys which are especially well adapted for use as solders for joining aluminum to copper or brass.

Hitherto, whenever it was desirable in the manufacture of a soldered multi-component product to use aluminum as one component because of its advantages of weight, cost, appearance or conductivity, in combination with copper or brass, the aluminum was not used in many instances because of the problems involved in soldering the aluminum to the copper or brass. Frequently, non-soldering techniques have been available for joining aluminum to copper or brass; however, such techniques are for many purposes less desirable than a commercially suitable soldering technique.

To exemplify this, in the manufacture of heat exchanger units it is recognized that such units employing fluid conducting tubes and heat transfer fins attached to the tubes would be very desirable from the cost standpoint if aluminum could be used for the fins and copper or brass for the tubing. Since no satisfactory soldering technique has been developed whereby aluminum fins can be joined to copper or brass tubing this form of heat exchanger has not been commercially available in any substantial quantities.

In manufacturing all brass or copper heat exchanger units in which the fins are attached to the tubing by soldering it has been found convenient to solder coat the tubing, shape the parts to the heat exchanger configuration, attach the fins to the solder coated tubing, then heat the unit to the solder to melt and wet the fin surfaces adjacent the tubing and finally cool the unit to form a rigid soldered heat exchanger. Other articles may be made in like manner.

If this technique is used in joining aluminum to copper or brass and using a zinc-cadmium solder, which is a suitable solder for aluminum, it has been found on shaping the product prior to the heating step that the zinc-cadmium solder coating will peel away from the copper or brass base to which it has been attached presenting exposed surfaces where no joining can be obtained.

Furthermore, the soldered joint formed between the copper or brass and aluminum will be susceptible to peeling apart when the end product is formed or accidentally bent.

It has been found that amounts of indium ranging up to 10% and preferably between .5% and 2.5% of the weight of solder when added to a zinc-cadmium solder will provide a solder coating on copper or brass which may be readily formed without peeling from the base metal. It has further been found that this zinc-cadmium solder containing indium is more resistant to electrolytic corrosion than the zinc-cadmium solder without the indium addition.

Accordingly, it is an object of this invention to provide a novel, efficient and inexpensive method for soldering aluminum elements to elements of copper or brass.

An additional object of this invention is to provide a novel solder alloy.

It is a further object of this invention to provide a solder coating for copper or brass which may be shaped without peeling and which is satisfactory for joining to aluminum elements.

A still additional object of this invention is to provide a solder for joining copper or brass to aluminum which will not peel away from the base when the base metal is bent or shaped.

Another object of this invention is to provide a novel solder having improved corrosion resistance properties when used in joining aluminum elements to copper or brass elements.

A still further object of this invention is to provide a novel and inexpensive method for securing aluminum fins to copper or brass tubing to form an efficient heat exchanger assembly.

Other objects and advantages of the invention will be more apparent from the following detailed description.

In manufacturing a heat exchanger unit a strip of copper is dipped into a bath of a zinc-cadmium base alloy having a composition ranging from 20 to 95% zinc and from 5 to 80% cadmium and having added thereto up to about 10% of indium causing a thin coating to adhere to the copper strip. The strip is then shaped into a tube having a longitudinal lap joint. Corrugated aluminum fins are next assembled in conjunction with the copper tubing. A suitable flux is then applied and the unit heated causing the solder to soften and wet the fin surfaces adjacent the tubing and firmly join the fins to the tubing as well as securely sealing the lap seam in the tube upon cooling.

Without this indium addition to the solder coating on the copper strip possesses a tendency to peel from the copper upon shaping the strip into tubing. This peeling effect produces bare spots on the copper tubing where no solder attachment may be obtained to securely seal the coolant-containing tube. This is extremely undesirable since the unit will not retain the coolant.

Heat exchangers may be made from brass instead of copper in like manner and in this connection brass is defined as being an alloy of copper and zinc with 60% or more copper. Additionally, a spirally wound strip of aluminum, punched aluminum strip or other suitable form of aluminum may be used for the fins instead of the corrugated aluminum.

A suitable solder for this purpose is an alloy containing 90% zinc and 10% cadmium to which 2% indium has been added. I have found that small amounts of other material may be present as impurities in the solder, e.g., aluminum, copper and magnesium in such amounts as to not adversely affect the qualities of the solder.

According to my invention a suitable solder contains about 20% to 95% zinc and about 5% to 80% cadmium to which has been added up to about 10% indium. On the addition of about .05% indium the tendency of the coating to peel is detectably reduced. Additions greater than .05% further reduce the tendency to peel until an optimum condition is reached at about .5% to 2.5% indium. Additions greater than 2.5% reduce the tendency of the solder coating to peel as compared with no indium addition; however, the solder coating becomes more brittle at these higher indium ranges and tends to form macro-cracks upon being formed thereby reducing the desirability of these higher additions.

Also it is desirable to keep the amount of indium to a minimum and yet of sufficient amount to produce the desired results because of the expense of indium. It is not precisely known why this indium addition prevents peeling of the solder from the copper base upon shaping the copper; however, it is suspected that it is caused by a modification of the interface between the copper and solder coatings.

It has been found on coating the copper by dipping it into the molten solder that the molten solder should be maintained at a relatively low temperature and that the dip time should be kept to a minimum. It is believed that this reduces the reaction between the copper and solder and reduces the thickness of the interface.

The following table indicates the resistance of the solder coating to peel and crack:

Table 1

| No. | Solder Composition | | | Base Metal | Dip Time, Seconds | Solder Temp., °F. | Results |
|---|---|---|---|---|---|---|---|
| | Zn | Cd | In Added | | | | |
| 1 | 95 | 5 | 0 | brass | 3 | 900 | peel. |
| 2 | 95 | 5 | 1 | do | 5 | 900 | slight peel, cracking. |
| 3 | 95 | 5 | 2 | do | 5 | 900 | no peel, no cracking. |
| 4 | 90 | 10 | 0 | copper | 5 | 850 | peel. |
| 5 | 90 | 10 | 2 | do | 10 | 850 | no peel. |
| 6 | 90 | 10 | 0 | brass | 3 | 850 | bad peel. |
| 7 | 90 | 10 | .05 | do | 3 | 825 | no peel, no cracking. |
| 8 | 90 | 10 | .1 | do | 3 | 820 | Do. |
| 9 | 90 | 10 | 1.0 | do | 1 | 850 | Do. |
| 10 | 90 | 10 | 2.0 | do | 3 | 950 | Do. |
| 11 | 90 | 10 | 2.5 | do | 3 | 900 | Do. |
| 12 | 90 | 10 | 10.0 | do | 5 | 900 | slight peel, some cracking. |
| 13 | 57 | 43 | 0 | do | 5 | 900 | extreme peel. |
| 14 | 57 | 43 | 3.0 | do | 5 | 900 | slight peel. |
| 15 | 17 | 83 | 0 | do | 5 | 900 | slight peel, cracking. |
| 16 | 17 | 83 | 2.0 | do | 5 | 900 | no peel, no cracking. |

The base metal was in strip form .006 inch thick; each strip with a solder coating was bent 180° upon itself and then reversely bent 90° along the same line, this treatment being more severe than normally occurring in commercial production. The results were based upon microscopic examination of the bend areas.

The following table illustrates the importance of dip time and dip temperature in connection with the ability of the solder coating to withstand peeling and cracking. The results were based upon the same conditions and observations:

Table 2

| No. | Solder Composition | | | Base Metal | Dip Time, Seconds | Solder Temp., °F. | Results |
|---|---|---|---|---|---|---|---|
| | Zn | Cd | In Added | | | | |
| 1 | 90 | 10 | .05 | brass | 3 | 825 | no peel, no cracking. |
| 2 | 90 | 10 | .05 | do | 5 | 825 | no peel, slight cracking. |
| 3 | 90 | 10 | .05 | do | 10 | 835 | slight peel, slight cracking. |
| 4 | 90 | 10 | .1 | do | 3 | 820 | no peel, no cracking. |
| 5 | 90 | 10 | .1 | do | 20 | 850 | Do. |
| 6 | 90 | 10 | 2.0 | do | 3 | 950 | Do. |
| 7 | 90 | 10 | 2.0 | do | 10 | 800 | Do. |
| 8 | 90 | 10 | 2.0 | do | 20 | 775 | Do. |
| 9 | 90 | 10 | 2.0 | do | 5 | 900 | Do. |
| 10 | 90 | 10 | 2.0 | do | 10 | 900 | no peel, slight cracking. |
| 11 | 90 | 10 | 2.0 | do | 10 | 950 | Do. |

It is observed in Table 1 that the addition of indium to the base alloy reduces or eliminates the tendency of the solder coating to peel from the base metal. In Table 2 it is observed that the tendency of the indium containing solder to peel or crack may be reduced or eliminated by reducing either the dip time or bath temperature, and that best results are obtained by keeping the dip time and bath temperature to an effective minimum. Thus it is noted that the tendency of the solder coating to peel is influenced by the indium content, dip time and bath temperature. As the indium content of solder approaches a minimum the protection against peeling is reduced and the dip time and bath temperature are much more critical. As the indium content increases towards 10% the coating has an increasing tendency to crack and peel with an increasing criticality in dip time and bath temperature. I have found that there is an optimum range between .5% and 2.5% indium added to the base alloy wherein excellent protection against cracking and peeling is obtained with less critical control of dip time and bath temperature.

It is noted that dip coating the copper strip to produce a reserve of solder for subsequent attachment of fins is a convenient method of producing best exchanges. However, the indium containing solder may be applied in the conventional manner by bringing together the components to be joined and heating the solder in the presence of a suitable flux to cause the solder to melt and flow over the surfaces to be joined. The joint formed by this conventional soldering method using the present solder will substantially reduce the tendency of the joint to peel when the joint is subjected to intentional or accidental bending forces, either in fabrication or use.

The following table illustrates the improved resistance to corrosion of a solder joint using the indium-containing solder in which a 3003 aluminum alloy (1.25% manganese, remainder aluminum plus normal impurities) tube was joined to a 70% copper, 30% zinc brass plate:

Table 3

| No. | Solder Composition | | | Temp., °F. | Joining Time, Minutes | Load, p.s.i. | No. Samples | Average Life, Days |
|---|---|---|---|---|---|---|---|---|
| | Zn | Cd | In added | | | | | |
| 1 | 80 | 20 | 0 | 800 | 12¼ | 2 | 10 | 23 |
| 2 | 80 | 20 | 0 | 800 | 12½ | 2 | 6 | 19 |
| 3 | 80 | 20 | 0 | 800 | 12½ | 2 | 6 | 16 |
| 4 | 80 | 20 | 2 | 800 | 11¾ | 2 | 10 | 37 |
| 5 | 80 | 20 | 2 | 800 | 12 | 2 | 10 | 37 |
| 6 | 80 | 20 | 2 | 900 | 7½ | 2 | 10 | 46 |

Note.—The brass plate was solder coated. Additional solder in wafer form was supplied to form the joint. All joints were furnace soldered and All State #107, made by All State Welding Alloys Co., Inc., White Plains, New York, was used as a flux. After soldering, the joints were washed thoroughly, and half of each joint exposed to a solution, 5% by weight sodium chloride and 0.3% by weight hydrogen peroxide at room temperature. The solution was changed daily and the life of the joint was measured as exposure time to the solution until the joint separated into two sections.

It has been found necessary to use a flux to insure that the solder will properly coat the metals being joined. A suitable aluminum soldering flux will be adequate such as All State No. 107 previously mentioned and Alumaweld Soldering Flux made by Johnson Manufacturing Company, Inc., of Mount Vernon, Illinois.

It has been found that the solder on copper or brass will crack in some instances when subjected to forming. This is not detrimental in the manufacture of heat exchangers manufactured by the process above described since the solder will readily flow and fill up the crack when heated and produce a sound joint; however it may lead to a defective joint if subjected to bending strains. To avoid this a solder composition, dip time and melt temperature should be selected in which the solder is less subject to cracking. If the solder is subject to peeling from the base metal, it is self-evident that its usefulness is practically nil as a solder. Soldering temperatures ranging from 775° to 950° F. and dip times ranging from 3 to 20 seconds with the above solder alloys have been found satisfactory.

I have explained the principle and mode of operation of my invention and have described the manner in which it may be practiced. However, I desire to have it understood that within the scope of the appended claims, the invention may be practiced in alloys having compositions differing from those specifically described and further variations and modifications, such as would occur to one skilled in the art, are considered part of the invention.

I claim:

1. The method of soldering aluminum to a metal selected from the group consisting of copper and brass which comprises coating the metal with a solder consisting essentially of about 20% to 95% zinc and about 5% to 80% cadmium to which has been added about .5% to 2.5% indium, positioning said aluminum against said metal in intimate contact with said solder coating, applying a suitable flux, applying sufficient heat to cause said solder coating to fuse and coat said aluminum, and solidifying said solder coating while said metal and aluminum are in juxtaposition.

2. The method of soldering aluminum to a metal selected from the group consisting of copper and brass which comprises applying thereto in the presence of heat and a suitable flux an alloy which consists essentially of from about 20% to 95% zinc and about 5% to 80% cadmium to which has been added about .5% to 2.5% indium.

3. The method of soldering aluminum to a metal selected from the group consisting of copper and brass which comprises coating the metal with a solder consisting essentially of about 20% to 95% zinc and about 5% to 80% cadmium to which has been added about .5% to 2.5% indium, shaping said metal to a desired configuration, applying a suitable flux, applying sufficient heat to cause said solder coating to fuse and coat said aluminum, and solidifying said solder coating while said metal and aluminum are in juxtaposition.

4. The method of soldering aluminum to a metal selected from the group consisting of copper and brass which comprises coating the metal with a solder consisting essentially of about 20% to 95% zinc and about 5% to 80% cadmium to which has been added about .5% to 2.5% indium, shaping said metal, positioning said aluminum against said metal in intimate contact with said solder coating, and solidifying said solder coating while said metal and aluminum are in juxtaposition.

5. The method of producing heat exchangers composed of fluid conducting tubes of a metal selected from the group consisting of copper and brass and cooling fins of aluminum: said method comprising coating the outer surface of a length of tubing of said metal with an alloy consisting essentially of about 20% to 95% zinc and about 5% to 80% cadmium to which has been added up to about .5% to 10% indium forming said tubing into the desired heat exchanger configuration, applying said cooling fins to said tubing, and fusing said alloy to said fins by the application of heat to said heat exchanger in the presence of a suitable flux.

6. The method of making a soldered joint at the interface between aluminum and a metal selected from the group consisting of copper and brass which comprises applying a molten solder composition consisting essentially of about 70 to 95% zinc and 30 to 5% cadmium to which has been added about .5 to 10% indium to the metallic interface and solidifying the resulting zinc-cadmium-indium solder while in contact with said interface.

7. The method of claim 6 wherein the addition of indium is in the range of about 0.5 to 2.5%.

References Cited in the file of this patent

UNITED STATES PATENTS

| | | |
|---|---|---|
| 669,425 | McAdams | Mar. 5, 1901 |
| 1,787,942 | Kallock | Jan. 6, 1931 |
| 2,211,813 | Franco-Ferreira | Aug. 20, 1940 |
| 2,278,155 | Steenstrup | Mar. 31, 1942 |
| 2,464,821 | Ludwick et al. | Mar. 22, 1949 |
| 2,717,840 | Bosch | Sept. 13, 1955 |
| 2,846,762 | Walker et al. | Aug. 12, 1958 |
| 2,872,730 | Jones | Feb. 10, 1959 |
| 2,873,216 | Schnable | Feb. 10, 1959 |

OTHER REFERENCES

"Solders for Aluminum," circular of The Bureau of Standards, No. 78, published by the Dept. of Commerce, Bureau of Standards, Jan. 28, 1919.

"Indium and Indium Plating," by M. T. Ludwick, Metal Finishing, January 1942, pp. 13–17.

"The Ternary System Indium-Cadmium-Zinc," by S. C. Carapella, Jr. and E. A. Perette, paper presented at the 32nd annual convention of the American Society for Metals, Chicago, October 23 to 27, 1950.

UNITED STATES PATENT OFFICE
CERTIFICATE OF CORRECTION

Patent No. 2,952,906 September 20, 1960

Ogle R. Singleton, Jr.

It is hereby certified that error appears in the above numbered patent requiring correction and that the said Letters Patent should read as corrected below.

Column 4, line 53, for "Mount Vernon, Illinois" read -- Mount Vernon, Iowa --.

Signed and sealed this 13th day of March 1962.

(SEAL)
Attest:

ERNEST W. SWIDER
Attesting Officer

DAVID L. LADD
Commissioner of Patents